United States Patent
Miyamoto et al.

(10) Patent No.: US 8,519,579 B2
(45) Date of Patent: Aug. 27, 2013

(54) ELECTRIC MOTOR

(75) Inventors: Tomohiko Miyamoto, Toyota (JP);
Naoto Koshino, Toyota (JP); Hiroshi Hoshina, Toyota (JP); Keiji Takizawa, Toyota (JP); Ko Hashimoto, Kariya (JP); Tetsuo Wakita, Chiryu (JP)

(73) Assignees: Toyota Jidosha Kabushiki Kaisha, Aichi-ken (JP); Aisin Seiki Kabushiki Kaisha, Aichi-ken (JP)

( * ) Notice: Subject to any disclaimer, the term of this patent is extended or adjusted under 35 U.S.C. 154(b) by 103 days.

(21) Appl. No.: 13/298,908

(22) Filed: Nov. 17, 2011

(65) Prior Publication Data

US 2012/0126642 A1   May 24, 2012

(30) Foreign Application Priority Data

Nov. 18, 2010   (JP) .................................. 2010-257439

(51) Int. Cl.
*H02K 9/00* (2006.01)

(52) U.S. Cl.
USPC .............................................. 310/54; 310/52

(58) Field of Classification Search
USPC ............................ 310/52, 54, 57, 58, 64, 179
See application file for complete search history.

(56) References Cited

U.S. PATENT DOCUMENTS

| | | | | |
|---|---|---|---|---|
| 4,227,108 A | * | 10/1980 | Washizu et al. | 310/214 |
| 5,936,326 A | * | 8/1999 | Umeda et al. | 310/179 |
| 6,933,633 B2 | * | 8/2005 | Kaneko et al. | 310/52 |
| 7,538,457 B2 | * | 5/2009 | Holmes et al. | 310/54 |
| 2005/0151429 A1 | * | 7/2005 | Taketsuna et al. | 310/54 |
| 2010/0045125 A1 | * | 2/2010 | Takenaka et al. | 310/54 |

FOREIGN PATENT DOCUMENTS

| | | |
|---|---|---|
| JP | 09-154255 A | 6/1997 |
| JP | 2004-064993 A | 2/2004 |
| JP | 2005-323416 A | 11/2005 |
| JP | 2006-271150 A | 10/2006 |
| JP | 2009-177864 A | 8/2009 |
| JP | 2011-229248 A | 11/2011 |

* cited by examiner

*Primary Examiner* — Nguyen N Hanh
(74) *Attorney, Agent, or Firm* — Sughrue Mion, PLLC

(57) ABSTRACT

An electric motor has a rotor, stator, and covers. A stator coil is a pre-wound coil inserted into slots of a stator core from its inner side. A no-lead-wire side coil end portion of the stator coil protrudes radially inward. A no-lead-wire side coolant chamber is liquid-tightly defined by the cover covering the no-lead-wire side coil end portion and a seal plate(s) that is attached from or on a radially inner side of the stator core so as to cover an opening between the inner peripheral edge of the cover and the inner peripheral edge of the stator core.

9 Claims, 8 Drawing Sheets

ELECTRIC MOTOR

INCORPORATION BY REFERENCE

The disclosure of Japanese Patent Application No. 2010-257439 filed on Nov. 18, 2010 including the specification, drawings and abstract is incorporated herein by reference in its entirety.

BACKGROUND OF THE INVENTION

1. Field of the Invention

The invention relates to electric motors, and in particular to electric motors having covers that cover, respectively, coil end portions protruding toward the respective axial sides of a stator and that define, respectively, a coolant chamber storing therein a coolant.

2. Description of Related Art

An electric motor is known which is provided with a stator having a plurality of stator coils circumferentially arranged at an inner periphery of a cylindrical stator core. The stator coils are each wound around one or more of teeth protruding radially inward from the inner periphery of the stator core, and the axial ends of each stator coil protrude outward from the respective axial ends of the stator, forming "coil end portions".

Lead wires are connected to the coils, and each coil is energized with the voltage externally supplied via the lead wires, so that a current occurs at the coil. At this time, a copper loss due to the electric resistance in the coil wire (e.g., a copper wire with an insulation coating) from which the coil is formed, and this causes the coil to heat up. As the coil thus heats up and its temperature increases, the insulation of the coil degrades. In particular, in the case of multi-phase alternating current electric motors, such insulation degradation may promote electric discharges between the coil end portions of coils for different phases, between which the electric potential difference is large. In order to prevent such electric discharges, coil end portions formed as described above are cooled using a coolant, such as a cooling oil.

Japanese Patent Application Publication No. 2006-271150, which is a related-art document, describes a motor generator cooling structure. In this cooling structure, coil end portions arranged in a generally annular form and each protruding outward from an axial end face of a stator core are liquid-tightly covered by a cooling jacket filled with an externally supplied cooling oil that contacts and thereby cools the coil end portions over the entire circumference. In the cooling structure, after the coils are wound, an adaptor is attached on slot openings at the inner periphery of the stator core, so as to seal the slot openings to prevent the cooling oil, after entering each slot from the cooling jacket, from leaking to the gap between the stator and the rotor.

Further, Japanese Patent Application Publication No. 2005-323416 describes a motor generator cooling structure in which a coil is disposed in slots of a stator core, the inside of each slot is made a coolant passage by closing the opening of the slot, which opens at the inner peripheral face of the stator core, cooling jackets are provided which surround, respectively, coil end portions protruding from the front and rear ends of the stator core, respectively, and thus form annular liquid-tight spaces, coolant inlets are formed at the lower sides of the respective cooling jackets at the front and rear ends of the stator core, coolant outlets are formed at the upper sides of the respective cooling jackets, and the coolant is made to flow from the lower side to the upper side in each cooling jacket.

Further, Japanese Patent Application Publication No. 2009-177864 describes a stator having a stator core and coils wound on the stator core, wherein coil end portions of the respective coils, which axially protrude from an axial end face of the stator core, are resin-molded to be made "resin-molded coil end portions", and this stator having the resin-molded coil end portions is characterized in that a cavity is provided in the stator core to reduce its weight. According to Japanese Patent Application Publication No. 2009-177864, in order to prevent the resin from entering the cavity when the coil end portions are resin-molded, a pair of sealing steel plates are provided on the respective axial end faces of the stator core so as to fully cover the openings of the cavity.

In both the structures described in Japanese Patent Application Publications No. 2006-271150 and No. 2005-323416, the coil end portions protruding toward the respective axial sides from the respective end faces of the stator core are shaped to be located, as viewed axially, between the inner and outer peripheral faces of the stator core, and the liquid-tight coolant passages are formed by covering the coil end portions by the cooling jackets each C-shaped in section.

However, some stator coils are formed such that no-lead-wire side coil end portions, which are coil end portions on one side, are radially large in size, protruding from an end face of the stator core radially inward. In this structure, a gap or opening is created between the inner peripheral edge of the jacket and the inner peripheral edge of the stator core. In such a case, therefore, a liquid-tight coolant chamber can not be formed by simply covering the coil end portions by a cooling jacket that is C-shaped in section. As such, electric motors having stator coils formed as described above require some measures for covering the gap or opening between the inner peripheral edge of the cooling jacket and the inner peripheral edge of the stator core if a coolant chamber needs to be formed around the coil end portions. Japanese Patent Application Publication No. 2009-177864 does not address this issue at all.

SUMMARY OF THE INVENTION

The invention provides an electric motor in which a coil end portion protruding radially inward is covered so as to form a liquid-tight coolant chamber.

An aspect of the invention relates to an electric motor. The electric motor has: a stator that is provided with a cylindrical stator core having, at an inner periphery thereof, a plurality of teeth arranged circumferentially and protruding, and a stator coil that is inserted into slots formed between the teeth of the stator core so as to provide coil windings around one or more of the teeth; a rotor that is rotatably provided in the stator; and covers that cover, respectively, a coil end portion being a part of the stator coil and protruding outward from one axial end face of the stator core and a coil end portion being a part of the stator coil and protruding outward from the other axial end face of the stator core, and that each define therein a coolant chamber in which a coil-end-cooling coolant is liquid-tightly stored. The stator coil is a pre-wound coil having a predetermined coil form and is inserted into the slots from the radially inner side of the stator core to provide the coil windings around the one or more of the teeth. The coil end portions include a lead-wire side coil end portion provided at one axial side to which a power feed line is connected and a no-lead-wire side coil end portion provided at the other axial side. The no-lead-wire side coil end portion is shaped to protrude to a position that is closer to the rotation axis of the rotor than the inner peripheral face of the stator core is. The coolant chamber in a no-lead-wire side where the no-lead-wire side coil end portion is present is formed liquid-tight by the cover covering the no-lead-wire side coil end portion and a seal member that is attached from or on the radially inner side of the stator core so as to cover an opening between the inner peripheral edge of the cover covering the no-lead-wire side coil end portion and the inner peripheral edge of the stator core.

The electric motor according to the aspect of the invention may be such that the seal member is constituted of a plurality of stepped-wedge-like seal plates that each have a large width portion at a radially inner side and are inserted, from the radially inner side of the stator core, into between the cover covering the no-lead-wire side coil end portion and a no-lead-wire side end face of the stator core, and the respective seal plates cover no-lead-wire side ends of radial openings of the respective slots of the stator core.

The electric motor according to the aspect of the invention may further have a cylindrical seal member that covers the inner peripheral face of the stator core so as to cover the radial openings of the respective slots over the entire axial lengths of the radial openings.

The electric motor according to the aspect of the invention may be such that the cylindrical seal member is integrally formed at the inner periphery of the cover covering the lead-wire side coil end portion.

The electric motor according to the aspect of the invention may be such that: the seal member includes a gear-shaped seal plate having: projecting portions that are formed at the outer periphery of the seal plate and fit in radial openings of the respective slots of the stator core when the seal plate is inserted into the inside of the stator core from a lead-wire side where the lead-wire side coil end portion is present; and root portions which are formed at the outer periphery of the seal plate and in which radial tip portions of the respective teeth of the stator core fit when the seal plate is inserted into the inside of the stator core from the lead-wire side; and the seal plate is inserted into the inside of the stator core from the lead-wire side, then moved out of the inside of the stator core, then set, in the no-lead-wire side, in a position between the cover covering the no-lead-wire side coil end portion and the no-lead-wire side end face of the stator core, then turned circumferentially between the cover covering the no-lead-wire side coil end portion and the no-lead-wire side end face of the stator core, so as to bring the projecting portions of the seal plate into contact with the axial end faces of tip portions of the respective teeth of the stator core, and then fixed in the position.

The electric motor according to the aspect of the invention may be such that: the seal member is a disc-spring-like seal plate of which the diameter is smaller than the inner diameter of the stator core when the seal member is inserted into the inside of the stator core from the lead-wire side, and increases when the seal plate is squashed in the no-lead-wire side, or is a split-ring-like seal plate that increases in diameter by being widened circumferentially; and the seal plate gets, by increasing in diameter in the no-lead-wire side, into between the protruding portion of the no-lead-wire side coil end portion and a no-lead-wire side end face of the stator core.

The electric motor according to the aspect of the invention may be such that the seal member has: a flange portion that covers the opening between the inner peripheral edge of the cover covering the no-lead-wire side coil end portion and the inner peripheral edge of the stator core; and a cylindrical portion that covers the inner peripheral face of the stator core so as to cover the radial openings of the respective slots over the entire axial lengths of the radial openings.

According to the electric motors of the aspect of the invention, the opening between the inner peripheral edge of the cover and the inner peripheral edge of the stator core is covered by the seal member that is attached from or on the radially inner side of the stator core, and therefore the coolant chamber provided around the no-lead-wire side coil end portion protruding radially inward is sealed more reliably. As such, it is possible to prevent leaks of the coolant from the coolant chamber, enhance the cooling of the stator coil, and achieves an improved insulation of the stator coil.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described in detail with reference to the accompanying drawings. It is to be noted that the shapes, forms, materials, values, directions, and so on, specified in the following descriptions are no more than examples for facilitating understanding of the invention, and thus they may be changed as needed in accordance with the use, purpose, specification, etc.

In the following, the coolant used in each of the electric motors of the respective example embodiments is a cooling oil. However, it is to be noted that the coolants applicable to cooling structures according to the invention are not limited to it, but they include various other coolants, such as cooling water (e.g., LLC (Long Life Coolant)).

Further, in this specification, the terms "axial direction", "axially", "axial", and the like, refer to the direction of the rotation axis of the rotor, the direction of the central axis of the cylindrical stator, and the directions corresponding to them, the terms "radial direction", "radially", "radial", and the like, refer to the directions perpendicular to such axial directions, and the terms "circumferential direction", "circumferentially", "circumferential", and the like, refer to each direction along the circumference of a circle drawn about a given point of the rotation axis on a plane perpendicular to the rotation axis.

Figure 1:
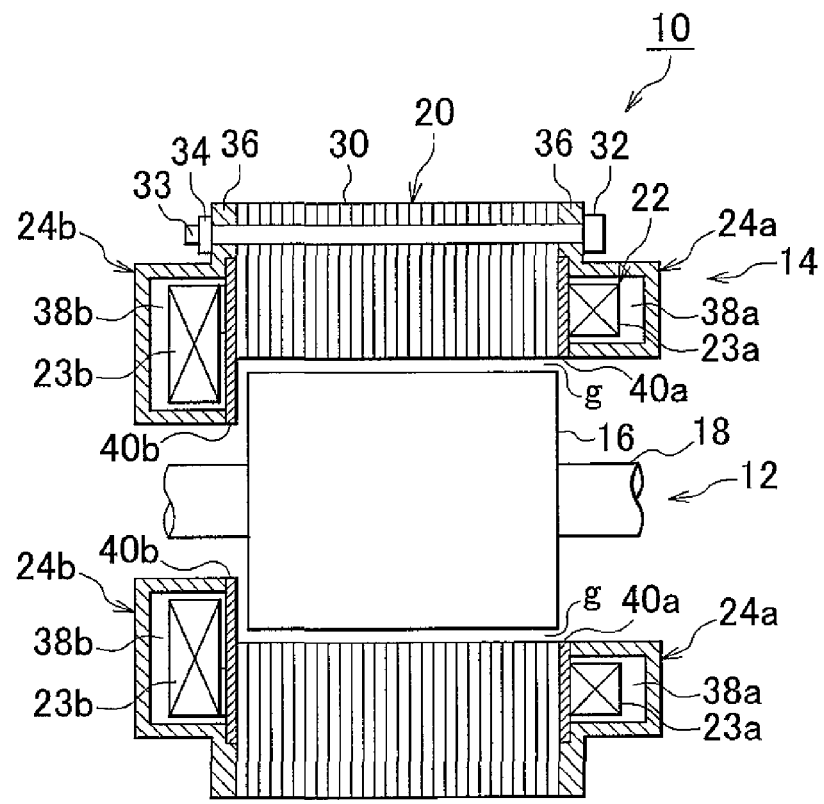
FIG. 1 is a sectional view, taken axially, of an electric motor of an example embodiment of the invention.

FIG. 1 shows an axial section of an electric motor 10 of an example embodiment of the invention. The electric motor 10 is a three-phase alternating current electric motor, for example, and it will hereinafter be referred to as "motor 10" where necessary. The motor 10 has a rotor 12 and a stator 14.

The rotor 12 has a rotor core 16 that is columnar and a rotor shaft 18 that penetrates the center of the rotor core 16. In the rotor core 16, multiple permanent magnets (not shown in the drawings) are embedded at equiangular positions close to the outer peripheral face of the rotor core 16. The both ends of the rotor shaft 18 are rotatably supported, respectively, by bearings (not shown in the drawings) attached in a motor case (not shown in the drawings). Further, the rotor core 16 is constituted of a plurality of generally circular electromagnetic steel plates that are axially stacked on top of each other and each have a shaft insert hole, magnet insert holes, and so on.

The stator 14 has a stator core 20, stator coils 22, and covers 24a and 24b. The stator core 20 is cylindrical and is constituted of, for example, a plurality of ring-shaped electromagnetic steel plates that are manufactured by punching electromagnetic steel plates into a ring shape and are then stacked and joined together by caulking, welding, adhesion, clamping, or the like. Created between the outer peripheral face of the rotor core of the rotor 12, which is provided on the radially inner side of the stator 14, and the inner peripheral face of the stator core 20 is a gap g extending over the entire circumference and having an uniform radial length. Preferably, the gap g is minimized to increase the motor efficiency, however it is designed also in consideration of other requirements, such as preventing the rotor core 16 from contacting the inner peripheral face of the stator core 20 during rotation of the rotor 12.

Multiple teeth 26 are formed at the inner periphery of the stator core 20. The teeth 26 are equiangularly arranged and protrude radially inward. The teeth 26 extend axially and are equal in axial length to the stator core 20. Provided between the respective teeth 26 adjacent to each other circumferentially are slots 28 (refer to FIG. 2). The total number of the slots 28 is equal to that of the teeth 26.

The stator coils 22 are each provided around one or more of the teeth 26 and formed of, for example, a copper wire having an insulation coating. In this example embodiment, the stator coils 22 are pre-wound coils, each wound beforehand into a predetermined coil form using a winding machine (winding form), or the like, and then attached by being inserted into the slots 28 from the radially inner side of the stator core 20. Each stator coil 22 is provided in the form of "distributed winding", that is, the axially extending portions of each stator coil 22 are inserted into two of the slots 28 that are a predetermined distance away from each other circumferentially across two or more of the teeth 26.

Figure 2:
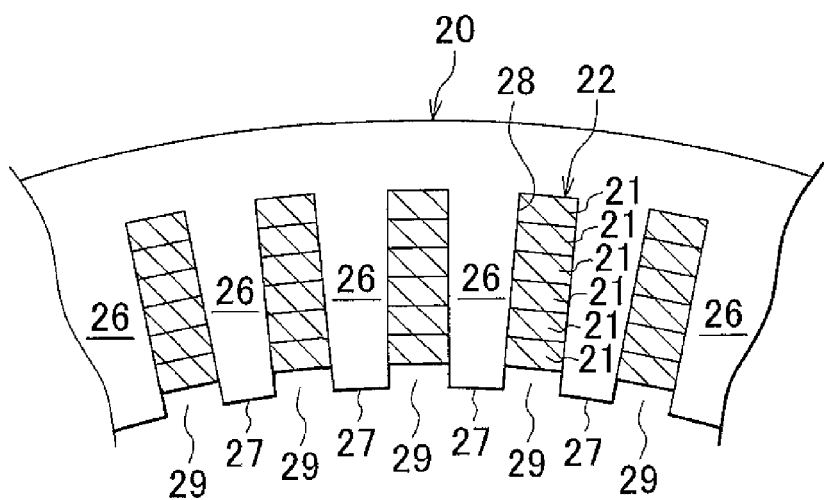
FIG. 2 is an enlarged view illustrating how stator coils are disposed in slots of a stator core.

FIG. 2 shows a cross section of the stator coils 22 set in the slots 28. In this example embodiment, the stator coils 22 are each formed of a rectangular coil wire having a flat rectangular cross section. In this example embodiment, six windings of the coil wire(s) 21 are radially stacked in each slot 28. The insulation between the stator core 20 and the stator coils 22 may be increased by interposing an insulation paper between the inner face of each slot 28 and the coil wire(s) 21 or filling resin into a gap between the inner face of each slot 28 and the coil wire(s) 21 if any. Further, in a case where there are gaps between the respective windings in each slot 28, the gaps may be filled with resin such that the coil wires 21 are supported by the slots 28. Further, if the gaps between the respective windings in each slot 28 are filled with resin, the cooling oil is prevented from entering the slots 28 from a cooling oil chamber, which will be described later, and therefore the cooling oil is prevented from flowing out to the gap g via radial openings 29, in the radially inner face of the stator core 20, of the respective slots 28, thereby avoiding an increase in the rotational resistance against the rotor 12, which may be caused if the cooling oil flows out to the gap g.

Referring back to FIG. 1, each stator coil 22 has coil end portions 23a and 23b protruding outward from the respective end faces of the stator core 20. The coil end portions 23a and 23b of the stator coils 22 are successively arranged in an annular form corresponding to the annular shape of the stator core 20, as viewed axially.

Lead wires (power feed lines) (not shown in the drawings) via which power is externally supplied are connected to the coil end portions 23a shown in the right side of FIG. 1. More specifically, since the motor 10 is a three-phase alternating current electric motor, three lead wires for the U-phase coil, V-phase coil, and W-phase coil are connected to the lead-wire side coil end portions 23a. In the following descriptions, the coil end portions to which the lead wires are connected will be referred to as "lead-wire side coil end portions" where necessary, while the coil end portions in the side opposite to where the lead-wire side coil end portions are present will be referred to as "no-lead-wire side coil end portions" where necessary. Further, the axial side where the lead wires are present (the right side in FIG. 1) will be referred to as "lead-wire side" where necessary, while the other axial side (the left side in FIG. 1) will be referred to as "no-lead-wire side" where necessary.

The lead-wire side coil end portions 23a protrude axially from the end face of the stator core 20 and are located, as viewed axially, between the outer and inner peripheral faces of the stator core 20. On the other hand, the no-lead-wire side coil end portions 23b are formed such that they extend radially inward along the axial end face of the stator core 20 and each protrude to a position closer to the rotor rotation axis than the inner peripheral face of the stator core 20 is, that is, than top faces 27 of the respective teeth 26 at the radially inner side (refer to FIG. 2) are.

In this example embodiment, the protruding portion of each no-lead-wire side coil end portion 23b is rectangular in section, but it may be formed into various other shapes. For example, the radially inner side outline of the protruding portion of each no-lead-wire side coil end portion 23b may be rounded (e.g., U-shaped), as viewed in section.

Multiple bolt insert portions 30 protrude radially outward at the outer periphery of the stator core 20. The bolt insert portions 30 are, for example, three, and they are equiangularly arranged. A bolthole penetrates the inside of each bolt insert portion 30. Bolts 32 are inserted into the respective boltholes from one axial side, and nuts 34 are screwed to bolt tips 33 of the respective bolts 32 at the other axial side, whereby the stator core 20, the lead-wire side cover 24a, and the no-lead-wire side cover 24b are joined together.

Meanwhile, internal thread holes may be provided at the motor case, and the bolt tips 33 of the respective bolts 32 may be screwed into the respective internal thread holes to fasten the stator 14.

The lead-wire side cover 24a is fixed to the stator core 20 so as to cover the lead-wire side coil end portions 23a, while the no-lead-wire side cover 24b is fixed to the stator core 20 so as to cover the no-lead-wire side coil end portions 23b. In the motor 10 of this example embodiment, the lead-wire side coil end portions 23a and the no-lead-wire side coil end portions 23b are different in shape and size, and therefore the two covers 24a and 24b are made different in shape, size, and sealing structure in accordance with the lead-wire side coil end portions 23a and the no-lead-wire side coil end portions 23b.

More specifically, the lead-wire side cover 24a is C-shaped (or bracket-shaped) in section and is annular, covering the lead-wire side coil end portions 23a over the entire circumference. Further, preferably, the lead-wire side cover 24a is made of a resin material that is insulative and non-magnetic. The lead-wire side cover 24a has, at its outer periphery, tabs 36 shaped correspondingly to the respective bolt inset portions 30 of the stator core 20, and the bolts 32 are inserted into insert holes formed at the respective tabs 36, whereby the lead-wire side cover 24a is fixed on the lead-wire side end face of the stator core 20.

On the other hand, the no-lead-wire side cover 24b is C-shaped (or bracket-shaped) in section and is annular, covering the no-lead-wire side coil end portions 23b over the entire circumference, as is the lead-wire side cover 24a. However, since the no-lead-wire side coil end portions 23b protrude radially inward and thus are large in size, the no-lead-wire side cover 24b is radially sized such that it protrudes radially inward more than the no-lead-wire side coil end portions 23b do, in order to cover the no-lead-wire side coil end portions 23b.

A lead-wire side cooling oil chamber 38a is provided around the lead-wire side coil end portions 23a in the lead-wire side cover 24a. The lead-wire side cooling oil chamber 38a stores therein the cooling oil fed via a cooling oil feed hole (not shown in the drawings). The lead-wire side ends of the radial openings 29 of the respective slots 28 of the stator core 20 are sealed by seal plates (seal members) 40a, keeping the lead-wire side cooling oil chamber 38a liquid-tight.

On the other hand, a no-lead-wire side cooling oil chamber 38b is provided around the no-lead-wire side coil end portions 23b in the no-lead-wire side cover 24b. The no-lead-wire side cooling oil chamber 38b stores therein the cooling oil fed via a cooling oil feed hole (not shown in the drawings). The no-lead-wire side ends of the radial openings of the respective slots 28 and an annular opening 39 between the radially inner peripheral edge of the no-lead-wire side cover 24b and the inner peripheral edge of the stator core 20 are sealed by seal plates (seal members) 40b, keeping the no-lead-wire side cooling oil chamber 38b liquid-tight.

According to the structure described above, the cooling oils stored, respectively, in the lead-wire side cooling oil chamber 38a and the no-lead-wire side cooling oil chamber 38b contact the lead-wire side coil end portions 23a and the no-lead-wire side coil end portions 23b axially, and radially, whereby the entireties of the lead-wire side coil end portions 23a and no-lead-wire side coil end portions 23b are cooled efficiently, that is, the entireties of the respective stator coils 22 can be cooled efficiently. As a result, the insulation of the stator coils 22 can be maintained or improved, and the current density at each stator coil 22 can be increased for a higher output of the motor.

While the cooling oil feed holes via which the cooling oils are fed, respectively, to the lead-wire side cooling oil chamber 38a and the no-lead-wire side cooling oil chamber 38b are individually provided at the covers 24a and 24b in the respective axial sides in the example presented above, a single cooling oil feed hole may alternatively be provided. In this case, for example, the lead-wire side cooling oil chamber 38a at one axial side and the no-lead-wire side cooling oil chamber 38b at the other axial side are interconnected via a communication passage (not shown in the drawings) and the cooling oil is fed to one of the cooling oil chambers 38a and 38b via the single cooling oil feed hole and then delivered to the other via the communication passage.

Meanwhile, the cooling oils heated through the cooling of the stator coils 22 are discharged to the outside via a cooling oil drain hole(s) (not shown in the drawings), then cooled through heat radiation at an oil cooler, or the like, and then recirculated to the cooling oil chambers using an oil pump(s), or the like.

First Example Embodiment

Figure 3:
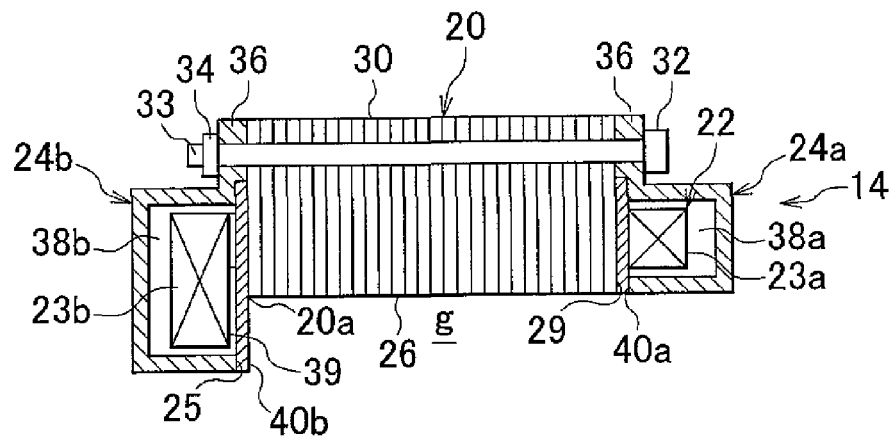
FIG. 3 is an enlarged sectional view showing the upper half of the stator shown in FIG. 1.
Figure 4:
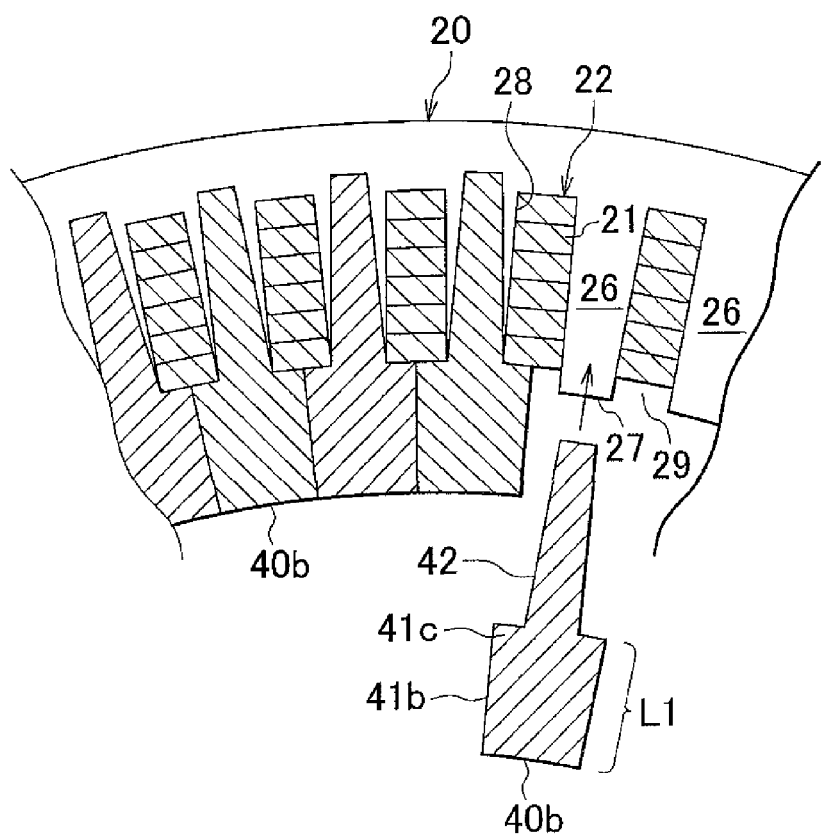
FIG. 4 is a view illustrating how seal plates are attached in the no-lead-wire side of an electric motor of the first example embodiment.
Figure 5:
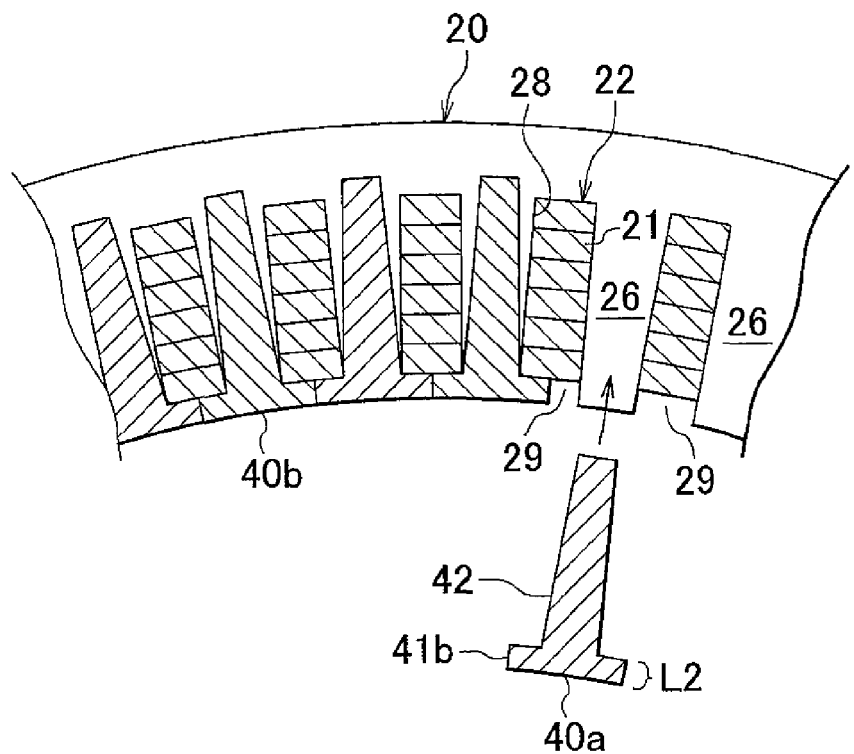
FIG. 5 is a view illustrating how seal plates are attached in the lead-wire side of the electric motor of the first example embodiment.

In the following, the seal structure for the cooling oil chambers in the motor 10 of the first example embodiment will be described with reference to FIGS. 3 to 5. FIG. 3 is an enlarged sectional view, taken axially, of the upper half of the stator 14 of the motor 10 shown in FIG. 1. FIG. 4 is a view illustrating how seal plates 40b are attached in the no-lead-wire side of the motor 10. FIG. 5 is a view illustrating how seal plates 40a are attached in the lead-wire side of the motor 10.

Referring to FIG. 3, the no-lead-wire side cooling oil chamber 38b is defined by the no-lead-wire side cover 24b and the seal plates 40b. The seal plates 40b cover the annular opening 39 between a radially inner peripheral edge 25 of the no-lead-wire side cover 24b and an inner peripheral edge 20a of the stator core 20. Preferably, the seal plates 40b are made of a non-magnetic material, such as resin, which does not affect the magnetic characteristic of the stator core 20.

Referring to FIG. 4, the seal plates 40b are multiple separate stepped-wedge-like members, the number of which is equal to the number of the teeth 26 and which are arranged circumferentially. Each seal plate 40b is generally T-shaped, having a large width portion 41b at the radially inner side and a tapered extension portion 42 at the radially outer side. Each seal plate 40b is inserted, from the radially inner side, into between the no-lead-wire side cover 24b and the no-lead-wire side end face of the stator core 20 while the lead-wire side cover 24a and no-lead-wire side cover 24b are temporarily, and lightly, attached on the store core 20 using the bolts 32 and nuts 34. That is, each seal plate 40b is inserted in a direction perpendicular to the axial direction and then fixed in position. After all the seal plates 40b are inserted over the entire circumference, the bolts 32 are tightened up, pressing and thus sealing the contact boundary between the no-lead-wire side cover 24b and the seal plates 40b. It is to be noted that an additional sealer, such as a gasket, O-ring, sealant, and adhesive, may be provided at or applied to the contact boundary to enhance the sealing effect.

The large width portions 41b of the respective seal plates 40b are tightly arranged along the entire circumference, covering the annular opening 39 between the radially inner peripheral edge 25 of the no-lead-wire side cover 24b and the inner peripheral edge 20a of the stator core 20. Further, each of the no-lead-wire side ends of the radial openings 29 of the respective slots 28 is covered by one of corner portions 41c located at the radially outer side of the large width portion 41b of the corresponding seal plate 40b and one of the corner portions 41c of the large width portion 41b of the seal plate 40b adjacent to the former seal plate 40b, whereby the no-lead-wire side cooling oil chamber 38b is sealed liquid-tightly. In the meantime, the tip of the extension portion 42 of each seal plate 40b is fit into a recess formed in the no-lead-wire side cover 24b and then fixed in position by being securely sandwiched between the no-lead-wire side cover 24b and the stator core 20.

Meanwhile, the sealing structure for the lead-wire side cooling oil chamber 38a is almost the same as described above. That is, the lead-wire side cooling oil chamber 38a is sealed by the multiple seal plates 40a that are inserted radially and then fixed in their positions by being sandwiched between the lead-wire side cover 24a and the lead-wire side end face of the stator core 20. For the lead-wire side cooling oil chamber 38a, it is sufficient that only the lead-wire side ends of the radial openings 29 of the respective slots 28 of the stator core 20 be covered, and therefore a radial length L2 of the large width portion 41b of each seal plate 40a is shorter than a radial length L1 of the large width portion 41b of each seal plate 40b in the no-lead-wire side, which is the only difference of the seal plates 40a from the seal plates 40b.

As described above, in the motor 10 of the first example embodiment, the seal plates 40b are inserted into the stator core 20 from the radially inner side so as to cover the opening 39 between the inner peripheral edge 25 of the no-lead-wire side cover 24b and the inner peripheral edge 20a of the stator core 20. Therefore, it is possible to reliably seal the no-lead-wire side cooling oil chamber 38b that is provided around the no-lead-wire side coil end portions 23b protruding radially inward. This prevents leaks of the cooling oil from the no-lead-wire side cooling oil chamber 38b, enhances the cooling of the stator coils 22, and achieves an improved insulation of the stator coils 22.

Further, since the gaps between the respective windings in each slot 28 and/or the gap between the inner wall face of each slot 28 and the windings in the same slot 28 are filled up with resin, or the like, there is no possibility that the cooling oil enter the slots 28 from the end face of the stator core 20 and then leak to the inner periphery of the stator core 20 or to the radially inner side of the stator core 20.

Second Example Embodiment

Figure 6:
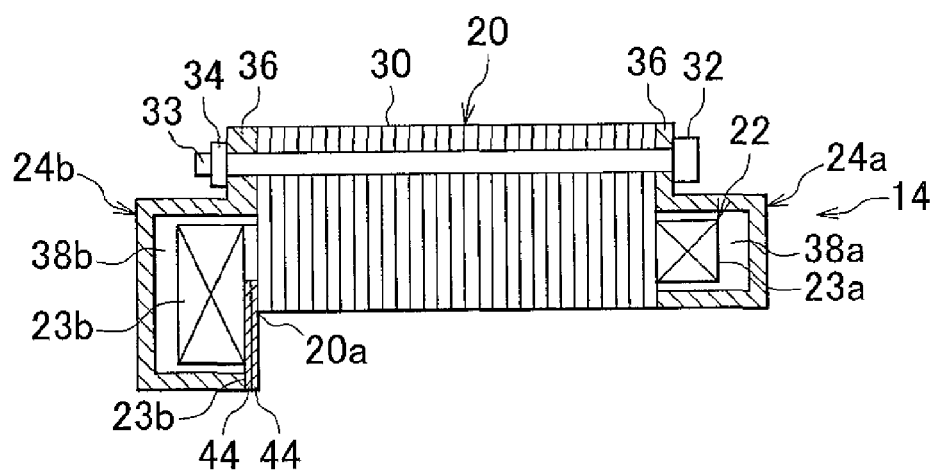
FIG. 6 is an enlarged sectional view corresponding to FIG. 3 and illustrating a state where seal plates have been set in an electric motor of the second example embodiment.
Figure 7:
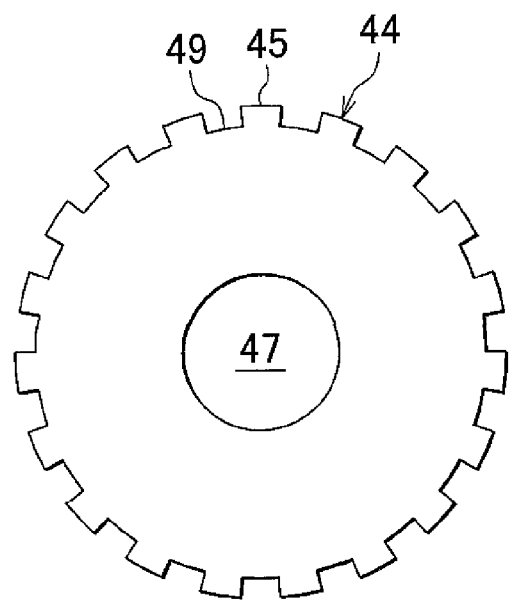
FIG. 7 is a plan view of the seal plates of the second example embodiment.
Figure 8:
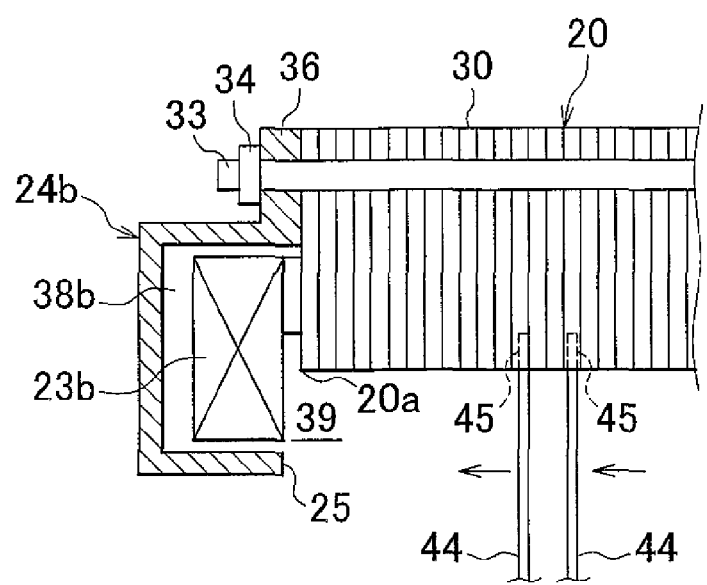
FIG. 8 is a view illustrating how the seal plates in the second example embodiment are inserted axially from the lead-wire side.
Figure 9:
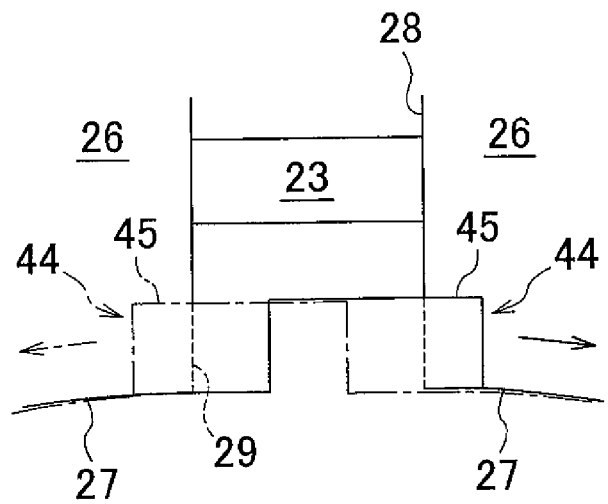
FIG. 9 is an enlarged partial sectional view illustrating how the seal plate in the second example embodiment are offset circumferentially and set in their positions in the no-lead-wire side.

In the following, the sealing structure for the cooling oil chambers in the motor 10 of the second example embodiment will be described with reference to FIGS. 6 to 9. FIG. 6 is an enlarged sectional view corresponding to FIG. 3 and illustrating how seal plates 44 are attached in the motor 10 of the second example embodiment. FIG. 7 is a plan view of each seal plate 44. FIG. 8 is a view illustrating how the two seal plates 44, after inserted into the stator core 20 from the lead-wire side, are moved toward the no-lead-wire side. FIG. 9 is an enlarged partial view illustrating how the seal plates 44 are offset from each other circumferentially and set in their positions in the no-lead-wire side.

The seal plates (seal members) 44 for liquid-tightly sealing the no-lead-wire side cooling oil chamber 38b cover, liquid-tightly, the opening 39 between the inner peripheral edge 25 of the no-lead-wire side cover 24b and the inner peripheral edge 20a of the stator core 20 and the no-lead-wire side ends of the radial openings 29 of the respective slots 28 of the stator core 20. In this example embodiment, the two seal plates 44 are stacked on each other (in contact with each other).

Referring to FIG. 7, each of the seal plates 44 is gear-shaped, having projecting portions 45 that fit into the radial openings 29 of the respective slots 28 of the stator core 20 and root portions 49 into which the radial tip portions 27 of the respective teeth 26 of the stator core 20 fit. The projecting portions 45 and the root portions 46 are alternately arranged at the outer periphery of each seal plate 44. A shaft hole 47 into which the rotor shaft 18 is inserted is formed at the center of each seal plate 44. Preferably, the seal plates 44 are also made of a non-magnetic material, such as resin, which does not affect the magnetic characteristic of the stator core 20.

The seal plates 44 are set in their position as follows. First, the two seal plates 44 are inserted, from the lead-wire side, into the stator core 20 in which the respective stator coils 22 have been already set. Then, the lead-wire side cover 24a and the no-lead-wire side cover 24b are temporarily, and lightly, attached on the stator core 20 using the bolts 32 and the nuts 34.

Referring to FIG. 8, the two seal plates 44 are pushed toward the no-lead-wire side with the projecting portions 45 and root portions 49 being almost tightly fit to the radial openings 29 of the slots 28 and the radial tip portions 27 of the teeth 26, respectively. Then, referring to FIG. 9 showing the seal plates 44 as viewed axially, after the seal plates 44 have been set in their positions between the no-lead-wire side cover 24b and the stator core 20 where the axially outer of the seal plates 44 is in contact with the no-lead-wire side cover 24b, one of the seal plates 44, which is drawn by solid lines in FIG. 9, is slightly turned in one circumferential direction (e.g., clockwise) such that each projecting portion 45 of the same seal plate 44 partially overlaps, as viewed axially, the axial end face of the radial tip portion 27 of the corresponding one of the teeth 26 of the stator core 20, while the other seal plate 44, which is drawn by single-dot lines in FIG. 9, is slightly turned in the other circumferential direction (e.g., counterclockwise) such that each projecting portion 45 of the same seal plate 44 partially overlaps, as viewed axially, the axial end face of the radial tip portion 27 of the corresponding one of the teeth 26 of the stator core 20, which is adjacent to the former corresponding one of the teeth 26. In this state, the seal plate 44 on the axially outer side is in tight contact with the radially protruding portions of the no-lead-wire side coil end portions 23b. That is, as viewed axially, the two seal plates 44 are circumferentially offset from each other such that the slots 28, which are formed between the respective teeth 26, are covered by the projecting portions 45 of the respective seal plates 44. Then, the bolts 32 are tightened to press the inner peripheral edge 25 of the no-lead-wire side cover 24b liquid-tightly against the seal plates 44.

In the second example embodiment, as described above, the two seal plates 44 are attached from the radially inner side of the stator core 20 so as to liquid-tightly cover the annular opening 39 between the inner peripheral edge 25 of the no-lead-wire side cover 24b and the inner peripheral edge 20a of the stator core 20 and the no-lead-wire side ends of the radial openings 29 of the respective slots 28 of the stator core 20. Therefore, it is possible to reliably seal the no-lead-wire side cooling oil chamber 38b that is provided around the no-lead-wire side coil end portions 23b protruding radially inward. This prevents leaks of the cooling oil from the no-lead-wire side cooling oil chamber 38b, enhances the cooling of the stator coils 22, and achieves an improved insulation of the stator coils 22.

The sealing structure for the lead-wire side cooling oil chamber 38a in this example embodiment is not specifically described above. However, the seal plates 44 described above or the seal plates 40a in the first example embodiment may be used for sealing the lead-wire side cooling oil chamber 38a. Alternatively, other sealer, such as a gasket, O-ring, sealant, and adhesive, may be provided or applied to seal only the lead-wire side ends of the radial openings 29 of the respective slots 28 of the stator core 20. Note that such sealing structures may be applied to the third and fourth example embodiments described later.

Third Example Embodiment

Figure 10:
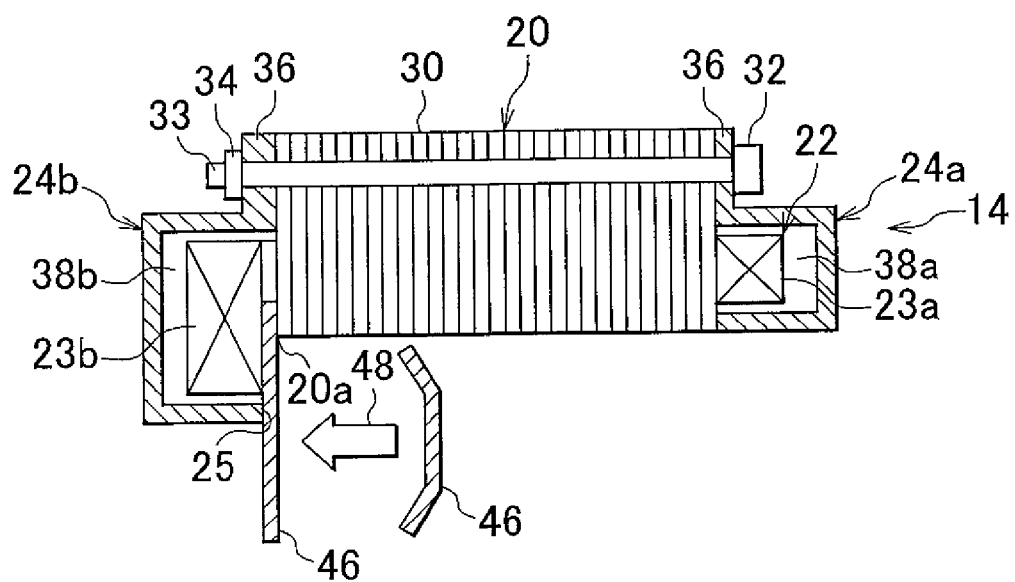
FIG. 10 is a view illustrating how a seal plate is set in position in an electric motor of the third example embodiment.
Figure 11A:
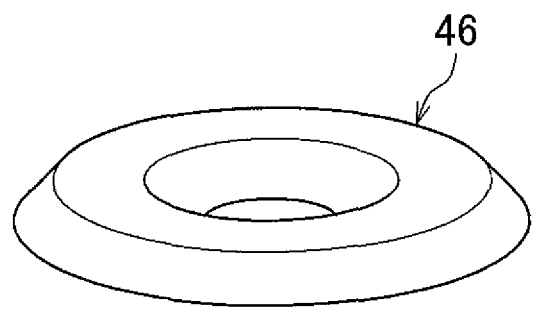
FIG. 11A is a perspective view of a seal plate in the third example embodiment.
Figure 11B:
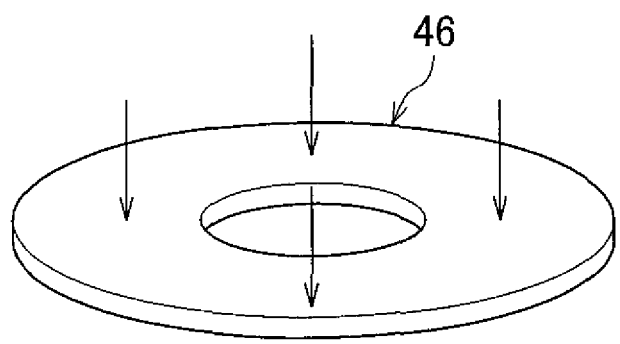
FIG. 11B is a perspective view of the seal plate shown in FIG. 11A when it is squashed.

In the following, the motor 10 of the third example embodiment will be described with reference to FIGS. 10, 11A, and 11B. FIG. 10 illustrates how a seal plate 46 is attached in the motor 10 of the third example embodiment. FIG. 11A is a perspective view of the seal plate 46. FIG. 11B is a perspective view of the seal plate 46 when squashed.

Referring to FIG. 10, the seal plate 46 is inserted into the stator core 20 from the lead-wire side and then pushed in the direction indicated by an arrow 48 in FIG. 10 with the lead-wire side cover 24a and the no-lead-wire side cover 24b being temporarily, and lightly, attached on the stator core 20 using the bolts 32 and the nuts 34. Referring to FIG. 11A, the seal plate 46 is shaped like a disc spring and is smaller, before attached in the motor 10, in diameter than the inner diameter of the stator core 20. More specifically, the seal plate 46 is an annular member of which the portion between the inner and outer peripheral edges is dented, toward one axial side, into an annular groove. Thus formed, the seal plate 46 increases in diameter as shown in FIG. 11B when squashed. In this example embodiment, too, preferably, the seal plate 46 is made of a non-magnetic material, such as resin, which does not affect the magnetic characteristic of the stator core 20.

After inserted from the lead-wire side then moved to the no-lead-wire side, the seal plate 46 is squashed by inserting, for example, a columnar tool from the lead-wire side, so that the seal plate 46 increases in diameter, causing the outer periphery of the seal plate 46 to get into between the protruding portions of the no-lead-wire side coil end portions 23b and the end face of the inner peripheral edge of the stator core 20, referring to FIG. 10. Then, the bolts 32 are tightened to press the inner peripheral edge 25 of the no-lead-wire side cover 24b against the seal plate 46 liquidly tightly.

In the third example embodiment, as described above, the seal plate 46 is attached from the radially inner side of the stator core 20 so as to liquid-tightly cover the opening 39 between the inner peripheral edge 25 of the no-lead-wire side cover 24b and the inner peripheral edge 20a of the stator core 20 and the no-lead-wire side ends of the radial openings 29 of the respective slots 28 of the stator core 20. Therefore, it is possible to reliably seal the no-lead-wire side cooling oil chamber 38b that is provided around the no-lead-wire side coil end portions 23b protruding radially inward. This prevents leaks of the cooling oil from the no-lead-wire side cooling oil chamber 38b, enhances the cooling of the stator coils 22, and achieves an improved insulation of the stator coils 22.

Fourth Example Embodiment

Figure 12A:
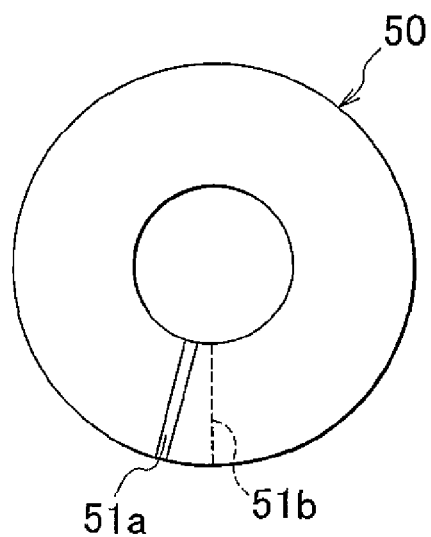
FIG. 12A is a plan view showing the shape of a split-ring-like seal plate in an electric motor of the fourth example embodiment.

In the following, the sealing structure in the motor 10 of the fourth example embodiment will be described with reference to FIGS. 12A and 12B. FIG. 12A is a plan view showing the shape of a seal plate 50 used in the fourth example embodiment, and FIG. 12B is a view illustrating how the seal plate 50, which is shaped like a split ring (or which is in the shape of the letter "C"), increases in diameter.

Referring to FIG. 12A, the seal plate 50 is a split-ring-like seal plate of which both circumferential ends 51a and 51b overlap each other and which is smaller in diameter than the inner diameter of the stator core 20, before the seal plate 50 is attached in the motor 10. Thus, the seal plate 50 can be inserted into the stator core 20 from the lead-wire side and then moved toward the no-lead-wire side as in the third example embodiment.

Figure 12B:
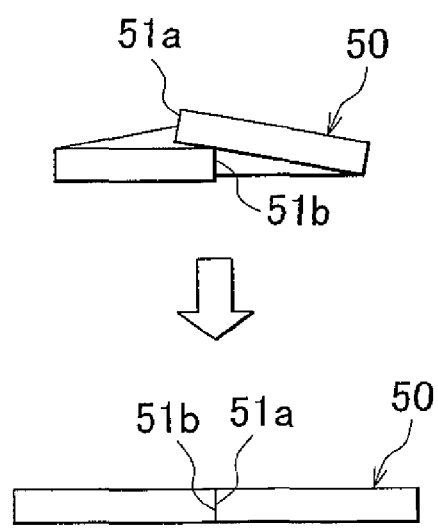
FIG. 12B is a view illustrating how the diameter of the split-ring-like seal plate increases.

Then, as shown in FIG. 12B, the ends 51a and 51b of the seal plate 50 are moved circumferentially away from each other and then butted against each other, whereby the diameter of the seal plate 50 is increased and maintained. The use of the seal plate 50 shaped like a split ring as describe above provides the same effects and advantages as those in the third example embodiment.

Fifth Example Embodiment

Figure 13:
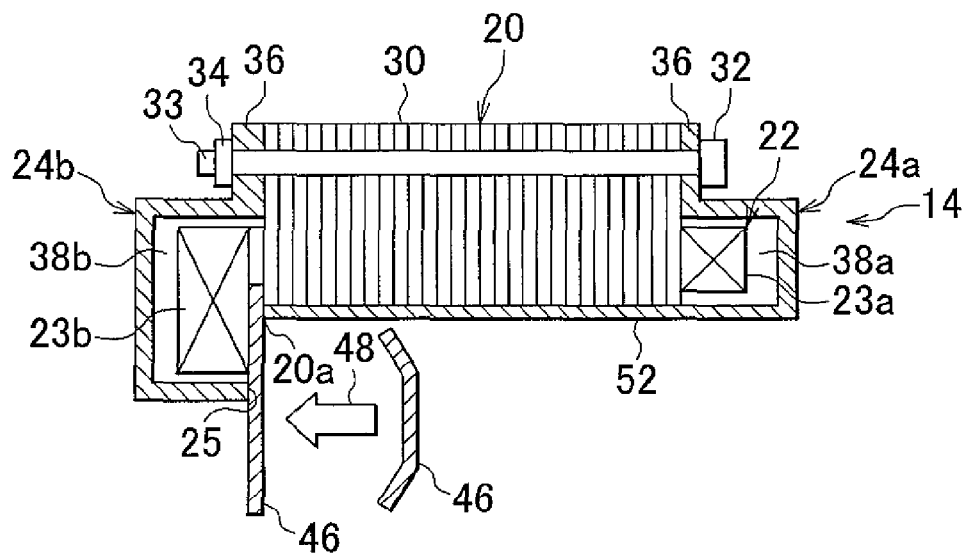
FIG. 13 is an enlarged sectional view corresponding to FIG. 3 and showing a seal member in the fifth example embodiment together with the seal plate in the fourth example embodiment.

In the following, the sealing structure in the motor 10 of the fifth example embodiment will be described with reference to FIG. 13. FIG. 13 is an enlarged sectional view corresponding to FIG. 3 and showing a seal member used in the motor 10 of the fifth example embodiment together with the seal plate 46 in the third example embodiment.

In this example embodiment, a cylindrical seal member 52 is provided which covers the inner peripheral face of the stator core 20 so as to cover the radial openings 29 of the respective slots 28 over their entire axial lengths. Preferably, the seal member 52 is formed integrally at the inner periphery of the lead-wire side cover 24a. However, the seal member 52 may be provided as a part separate from the lead-wire side cover 24a.

For example, the seal member 52 is set in position by being press-fit to the inner periphery of the stator core 20 from the lead-wire side after the seal plate 46 in the third example embodiment is set in position in the no-lead-wire side. A sealer, such as a gasket, O-ring, sealant, and adhesive, may be provided at or applied to the boundary between the cylindrical seal member 52 and the seal plate 46, at which they are pressed against each other.

According to the structure described above, since the cylindrical seal member 52 is provided on the radially inner side of the stator core 20 to cover the radial openings 29 of the respective slots 28 over their entire axial lengths, the cooling oil can be more reliably prevented from leaking to the gap g from the cooling oil chambers 38a and 38b at the respective axial sides via the slots 28. It is to be noted that the sealing effect of the seal plate 46 is as described above.

Sixth Example Embodiment

Figure 14:
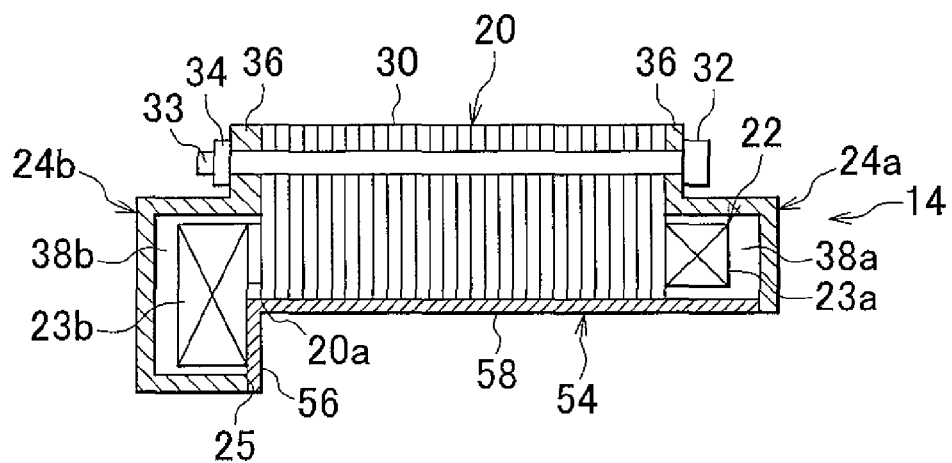
FIG. 14 is an enlarged sectional view corresponding to FIG. 3 and showing a seal member in the sixth example embodiment.

In the following, the sealing structure in the motor 10 of the sixth example embodiment will be described with reference to FIG. 14. FIG. 14 is an enlarged sectional view corresponding to FIG. 3 and showing a seal member 54 in the sixth example embodiment.

The seal member 54 has a flange portion 56 that covers, in the no-lead-wire side, the opening 39 between the inner peripheral edge 25 of the no-lead-wire side cover 24b and the inner peripheral edge 20a of the stator core 20 and a cylindrical portion 58 that covers the inner peripheral face of the stator core 20 so as to cover the radial openings 29 of the respective slots 28 over their entire axial lengths. A lead-wire side portion of the cylindrical portion 58 serves as a part of the inner peripheral wall face of the lead-wire side cooling oil chamber 38a.

The seal member 54 may be set in position in the same manner as the cylindrical seal member 52 in the fifth example embodiment is. However, since the seal member 54 of the sixth example embodiment additionally has the flange portion 56 that is a seal plate covering the opening 39 of the no-lead-wire side cooling oil chamber 38b, the sixth example embodiment provides an advantage that the cooling chambers 38a and 38b at the respective axial sides can be made simpler in structure, as well as the effects and advantages of the foregoing example embodiments.

While the invention has been embodied as the sealing structure for the cooling chambers in the motor 10 in each of the first to sixth example embodiments, it is to be understood that the invention is not limited to any of the structures and arrangements described above, but it may be embodied with various modifications and improvements.

For example, the seal plates and seal members employed in the first to sixth example embodiments may be used in various combinations.

Further, while the stator coils 22, which are pre-wound coils, are provided on the stator core 20 in the form of "distributed winding", the invention may also be embodied as, for example, an electric motor having, as stator coils, pre-wound coils provided around the respective teeth in the form of "concentrated winding".

What is claimed is:

1. An electric motor comprising: a stator that is provided with a cylindrical stator core having, at an inner periphery thereof, a plurality of teeth arranged circumferentially and protruding, and a stator coil inserted into slots formed between the teeth of the stator core so as to provide coil windings around one or more of the teeth; a rotor that is rotatably provided in the stator; and covers that cover, respectively, a coil end portion being a part of the stator coil and protruding outward from one axial end face of the stator core and a coil end portion being a part of the stator coil and protruding outward from the other axial end face of the stator core, and that each define therein a coolant chamber in which a coil-end-cooling coolant is liquid-tightly stored, wherein:
    the stator coil is a pre-wound coil having a predetermined coil form and is inserted into the slots from a radially inner side of the stator core to provide the coil windings around the one or more of the teeth;
    the coil end portions include a lead-wire side coil end portion provided at one axial side to which a power feed line is connected and a no-lead-wire side coil end portion provided at the other axial side;
    the no-lead-wire side coil end portion is shaped to protrude to a position that is closer to a rotation axis of the rotor than an inner peripheral face of the stator core is; and
    the coolant chamber in a no-lead-wire side where the no-lead-wire side coil end portion is present is formed liquid-tight by the cover covering the no-lead-wire side coil end portion and a seal member that is attached from or on the radially inner side of the stator core so as to cover an opening between an inner peripheral edge of the cover covering the no-lead-wire side coil end portion and an inner peripheral edge of the stator core.

2. The electric motor according to claim 1, wherein the seal member is constituted of a plurality of stepped-wedge-like seal plates that each have a large width portion at a radially inner side and are inserted, from the radially inner side of the stator core, into between the cover covering the no-lead-wire side coil end portion and a no-lead-wire side end face of the stator core, and the respective seal plates cover no-lead-wire side ends of radial openings of the respective slots of the stator core.

3. The electric motor according to claim 2, further comprising a cylindrical seal member that covers the inner peripheral face of the stator core so as to cover radial openings of the respective slots over entire axial lengths of the radial openings.

4. The electric motor according to claim 3, wherein the cylindrical seal member is integrally formed at an inner periphery of the cover covering the lead-wire side coil end portion.

5. The electric motor according to claim 1, wherein:
    the seal member includes a gear-shaped seal plate having: projecting portions that are formed at an outer periphery of the seal plate and fit in radial openings of the respective slots of the stator core when the seal plate is inserted into an inside of the stator core from a lead-wire side where the lead-wire side coil end portion is present; and root portions which are formed at the outer periphery of the seal plate and in which radial tip portions of the respective teeth of the stator core fit when the seal plate is inserted into the inside of the stator core from the lead-wire side; and
    the seal plate is inserted into the inside of the stator core from the lead-wire side, then moved out of the inside of the stator core, then set, in the no-lead-wire side, in a position between the cover covering the no-lead-wire side coil end portion and a no-lead-wire side end face of the stator core, then turned circumferentially between the cover covering the no-lead-wire side coil end portion and the no-lead-wire side end face of the stator core, so as to bring the projecting portions of the seal plate into contact with axial end faces of tip portions of the respective teeth of the stator core, and then fixed in the position.

6. The electric motor according to claim 5, wherein:
    the seal member includes another gear-shaped seal plate having: projecting portions that are formed at an outer periphery of the seal plate and fit in the radial openings of the respective slots when the seal plate is inserted into the inside of the stator core from the lead-wire side; and root portions which are formed at the outer periphery of the seal plate and in which the radial tip portions of the respective teeth of the stator core fit when the seal plate is inserted into the inside of the stator core from the lead-wire side;
    the two seal plates are in contact with each other; and
    the projecting portions of one of the two seal plates and the projecting portions of the other of the two seal plates are circumferentially offset from each other so as to cover, as viewed axially, the radial openings of the respective slots of the stator core.

7. The electric motor according to claim 1, wherein:
    the seal member is a disc-spring-like seal plate of which a diameter is smaller than an inner diameter of the stator core when the seal member is inserted into an inside of the stator core from a lead-wire side where the lead-wire side coil end portion is present, and increases when the seal plate is squashed in the no-lead-wire side, or is a split-ring-like seal plate that increases in diameter by being widened circumferentially; and
    the seal plate gets, by increasing in diameter in the no-lead-wire side, into between the protruding portion of the no-lead-wire side coil end portion and a no-lead-wire side end face of the stator core.

8. The electric motor according to claim 1, wherein:
the seal member has: a flange portion that covers the opening between the inner peripheral edge of the cover covering the no-lead-wire side coil end and the inner peripheral edge of the stator core; and a cylindrical portion that covers the inner peripheral face of the stator core so as to cover radial openings of the respective slots over entire axial lengths of the radial openings.

9. The electric motor according to claim 8, wherein the cylindrical member is integrally formed at an inner periphery of the cover covering the lead-wire side coil end portion.

* * * * *